(12) United States Patent
Robotham

(10) Patent No.: US 6,550,781 B1
(45) Date of Patent: Apr. 22, 2003

(54) SEAL ELEMENT

(75) Inventor: Michael Robotham, Chesterfield (GB)

(73) Assignee: Kvaerner Engineering & Construction UK Limited (GB)

( * ) Notice: Subject to any disclaimer, the term of this patent is extended or adjusted under 35 U.S.C. 154(b) by 0 days.

(21) Appl. No.: 09/615,429

(22) Filed: Jul. 13, 2000

(30) Foreign Application Priority Data

Jul. 14, 1999 (GB) .............................................. 9916373

(51) Int. Cl.⁷ ................................................ F16J 15/32
(52) U.S. Cl. ..................... 277/551; 277/551; 277/562; 277/565; 384/486
(58) Field of Search ................................ 277/353, 551, 277/552, 562, 560, 566; 384/485, 486

(56) References Cited

U.S. PATENT DOCUMENTS

| 3,822,890 | A | * | 7/1974 | Bourgeois | |
|---|---|---|---|---|---|
| 4,165,881 | A | | 8/1979 | Salter | .......................... 277/152 |
| 4,234,196 | A | * | 11/1980 | Iida | |
| 4,557,612 | A | * | 12/1985 | Neal | .......................... 384/488 |
| 4,586,720 | A | * | 5/1986 | Simmons et al. | |
| 4,866,827 | A | * | 9/1989 | Benfer et al. | ........... 29/148.4 S |
| 4,968,044 | A | * | 11/1990 | Petrak | |
| 5,556,112 | A | * | 9/1996 | Brandt | |
| 5,967,527 | A | * | 10/1999 | Fabro et al. | ................. 277/560 |

FOREIGN PATENT DOCUMENTS

| GB | 2076481 A1 | * | 12/1981 |
| GB | 2 169 971 | | 7/1986 |
| JP | 9-310764 | | 2/1997 |
| JP | 2000-24709 | | 1/2000 |

* cited by examiner

Primary Examiner—Anthony Knight
Assistant Examiner—Alison K. Pickard
(74) Attorney, Agent, or Firm—Factor & Partners

(57) ABSTRACT

A seal element mountable on the tapered section of a roll neck in a rolling mill comprising a notch and/or non-perpendicularly disposed water-side flange which serve to accommodate any tendency for the water-side flange to distort in the stressed state.

18 Claims, 3 Drawing Sheets

SEAL ELEMENT

The present invention relates to a seal element used in a sealing assembly for use in a rolling mill.

A rolling mill may be operated under wet conditions in which water is fed over the roll. A certain amount of water is inevitably dispersed into the direction of the roll neck and the lubricated areas of the bearing assembly. A sealing assembly may be used on the tapered section of the roll neck in order to maintain a liquid barrier between the roll and the bearing assembly.

A conventional sealing assembly is described in GB-A-2169971 (Morgan Construction Company). This particular sealing assembly comprises a flexible, circular seal element mounted directly on the rotatable tapered section of the roll neck and located at the interface of the roll and lubricated contact surface of the bearing assembly. The circular seal element comprises an annular main body which is provided with various flanges and lips. More particularly, outwardly disposed radial, water-side and oil-side flanges provided on the annular body impinge upon a surface of the fixed portion of the bearing assembly by means of flexible peripheral lips extending angularly outwardly from the heel portion of the flanges. Circular water-side and oil-side lips are arranged to mount the seal element on the tapered section of the rolling mill roll neck.

In the unstressed state, the water-side lip extends substantially axially from one end of the annular main body and the oil-side lip extends angularly inwardly from the annular main body. When the seal is mounted on the tapered roll neck section (ie is in the stressed state), the annular main body is radially stressed and the water-side flange is radially expanded. Radial expansion of the water-side lip subjects the annular main body to a circumferential bending moment which tends to distort the water-side flange from its unstressed perpendicular orientation. Axial shifting of the roll causes the peripheral lip of the angularly displaced water-side flange to come into excessive frictional contact with the seal end plate thereby causing premature wear.

In order to actively address this problem, the seal body of GB-A-2169971 is provided with means adapted to co-act with the tapered roll neck section to counteract the bending moment. More specifically, the counteracting means comprises an inwardly protruding circular shoulder (eg of triangular cross-section) which co-acts with the tapered roll neck section to produce a corrective bending moment in opposition to the bending moment produced by radial expansion of the axially extending lip. However, there is evidence that the shoulder on the seal body causes the seal to leak.

The present invention seeks to address certain shortcomings exhibited by conventional seal elements in the stressed state by accommodating the distortion of the seal element. More specifically, by accommodating distortion in the stressed state rather than seeking to counteract it in accordance with the prior art, the seal fits better on the roll neck and the reliability of the seal element is thereby improved.

Thus viewed from one aspect the present invention provides a seal element mountable on the tapered section of a roll neck in a rolling mill, the seal element comprising:

a substantially annular main body from which (in the unstressed state) extends substantially axially a water-side lip and from which extends a water-side flange in a radial direction; and means for accommodating the tendency for the water-side flange to distort when the seal element is axially received on the tapered section of a roll neck.

In a preferred embodiment of the invention, the means for accommodating comprises a notch provided at or near to the junction of the axial water-side lip and annular main body. For example, the notch may be provided on a tapered interior surface of the seal element (eg the interior surface of an oil-side lip, see FIG. 3) or on the interior surface of the axial, water-side lip, see FIG. 1. Preferably, the notch is provided around the full circumferential extent of the seal element. Particularly preferably, the notch is a circular U-shaped channel. In accordance with the invention, the notch accommodates the distortion of the water-side flange in the stressed state and would appear to act in a hinge-like fashion.

In a preferred embodiment of the invention, the water-side flange is non-perpendicularly disposed in the radial direction. Preferably, the water-side flange is disposed at less than 90°, typically at an angle of 60 to 89°, particularly preferably 70 to 85°, especially preferably about 80° to the axis of the seal element. In accordance with the invention, the non-perpendicular disposition of the water-side flange serves to accommodate the distortion of the water-side flange in the stressed state.

In a particularly preferred embodiment, the seal element comprises both features of the first and second embodiments, namely the notch and the non-perpendicularly disposed water-side flange.

Preferably, the seal element is provided with an oil-side, angularly disposed, flexible lip adapted to assist mounting on the tapered section of the rolling mill roll neck. Preferably, the oil-side lip is provided with an enlarged peripheral end which may be conveniently provided with a cutaway portion for encapsulating a garter spring to improve the seal.

Preferably, the seal element further comprises one or more oil-side flanges. Particularly preferably, a first oil-side flange is adapted to sliding the contact the stationary portion of the sealing assembly (eg the seal end plate) in a similar manner to the water-side flange. For this purpose, the water-side and oil-side flanges are preferably provided with peripheral lips which extend from the heel portion of the flange. Preferably, the oil and water-side flanges are axially separated by a cylindrical exterior surface.

The seal element may be provided with a circular oil flinger which provides a further barrier to oil ingress to the water-side. The seal element is advantageously provided with a coiled spring or wire embedded in the annular main body.

Viewed from a further aspect the present invention provides a sealing assembly for use in conjunction with the rotatable tapered section of a roll neck which is part of a roll in a rolling mill, said sealing assembly having a first bearing element mounted on said rotatable tapered section and at least partially opposing a fixed second bearing element to define a contact surface therebetween which is adapted to receive lubricant, wherein said first bearing element comprises a seal element as hereinbefore defined positioned between the contact surface and the roll.

The fixed second bearing element may comprise a seal end plate upon which the seal element is adapted to be slidingly contactable. The first bearing element preferably comprises a sleeve mounted on the rotatable roll neck. The fixed second bearing element preferably comprises a fixed bushing carried in a bearing chock. The sleeve is conveniently provided with an outer surface which is adapted to be rotatable within an inner surface of the fixed bushing thereby defining the contact surface at the oil-side of the seal element opposite to the roll, water-side. Lubricant (eg oil) is fed to the contact surface and an extended portion of the chock conveniently serves as an oil reservoir for drainage and re-circulation purposes. The seal end plate may be mounted adjacent and attached to the chock on the non-roll, oil-side in a conventional manner.

The fixed second element of the bearing assembly may comprise a downwardly depending deflector attached on the roll side to withstand liquid (eg water) passage from the roll to the seal element. The deflector may be conveniently mounted on the seal end plate. The deflector preferably comprises a coolant seal. The seal assembly may also comprise a water-side flinger ring carried on the roll for rotation therewith.

The present invention will now be described in a non-limitative sense with reference to the accompanying Figures in which.

Figure 1:
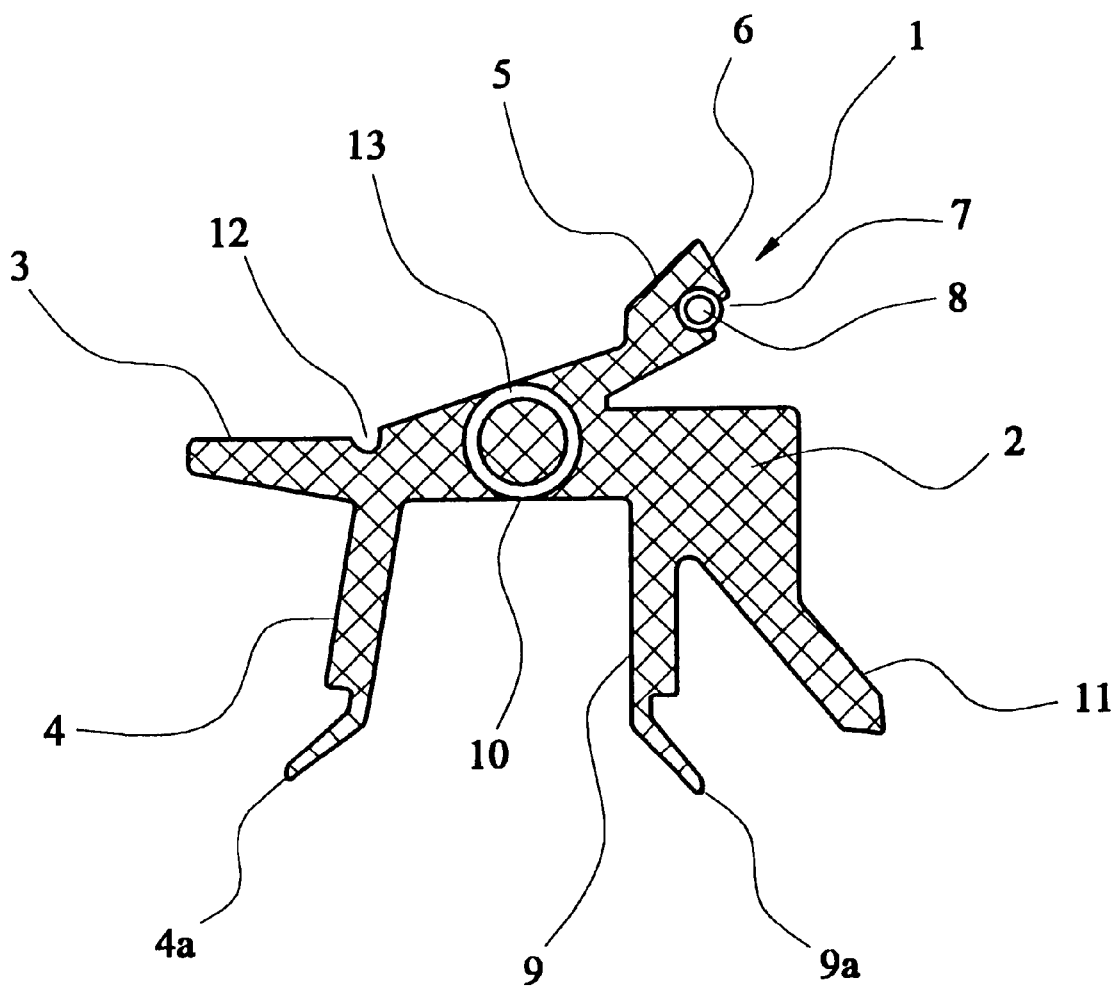
FIG. 1 illustrates a preferred embodiment of the seal element of the invention in cross-sectional view.

FIG. 1 illustrates a preferred embodiment of the seal element of the invention in an unstressed state designated generally by reference numeral 1. The seal element comprises annular main body 2 and an axially extending, water-side lip 3 together with a water-side flange 4 extending in a radial direction. The seal element 1 further comprises an oil-side, angularly disposed, flexible lip 5 with an enlarged peripheral end 6 having a cut away portion 7 for encapsulating a garter spring 8. For added strength, the annular main body is provided with a coil spring 13.

The seal element further comprises a first oil-side flange 9 axially separated from the water side flange by a cylindrical exterior surface 10. To prevent oil ingress to the water-side, the seal element is provided with a circular oil flinger 11. The water-side and oil-side flanges are each provided respectively with peripheral lips 4a and 9a extending from their heel portion.

The junction of the axial water-side lip and annular main body is provided with a notch 12 on the interior surface which extends around the full circumferential extent of the seal element. The notch 12 takes the form of a circular U-shaped channel. It will be appreciated that the water-side flange (as shown in the unstressed state) is non-perpendicularly disposed in the radial direction. The presence of the notch and non-perpendicularly disposed water side flange serve to accommodate any tendency for the water side flange to distort in the stressed state.

Figure 2:
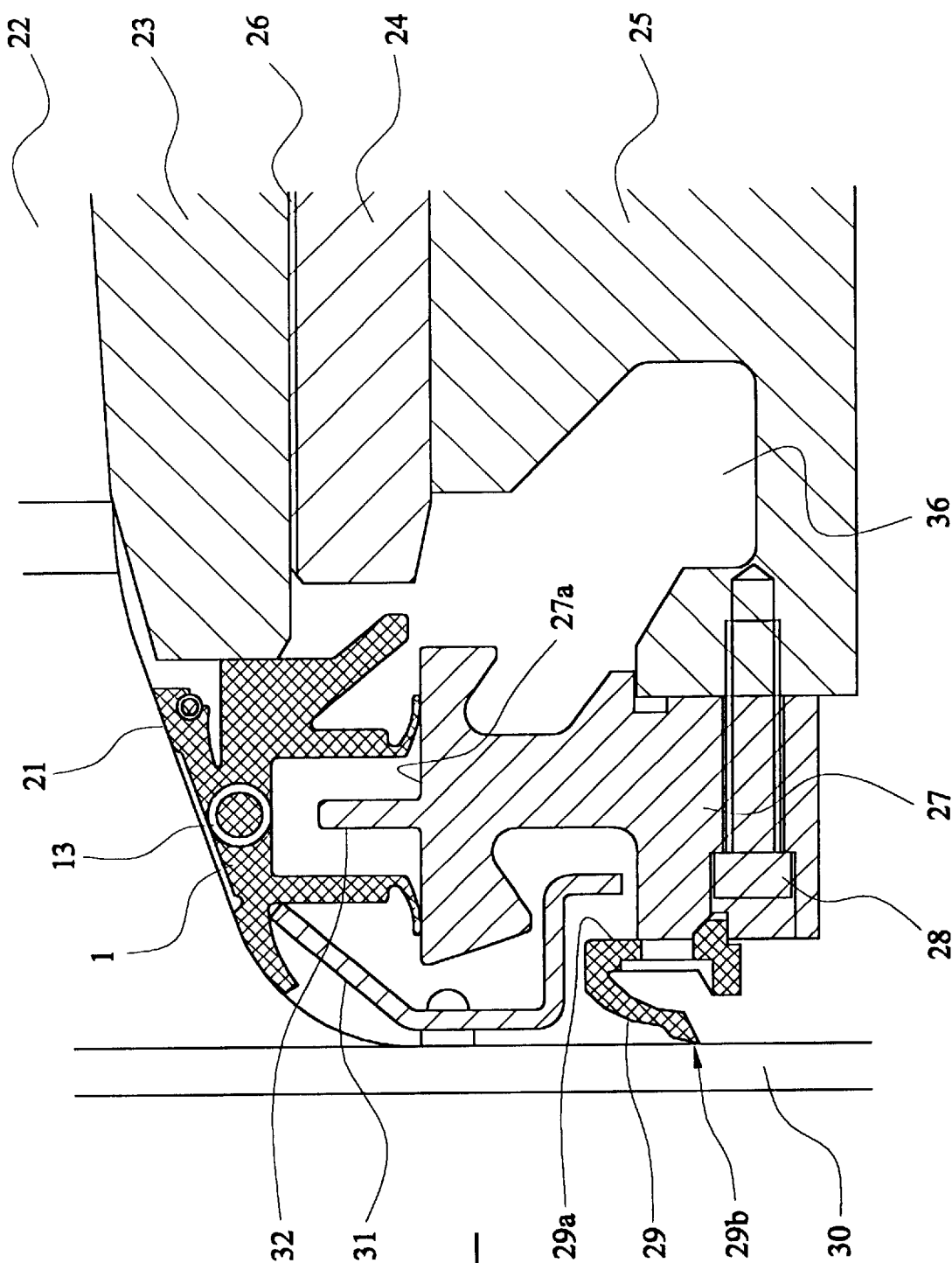
FIG. 2 illustrates a preferred embodiment of the seal assembly of the invention in cross-sectional view.
Figure 3:
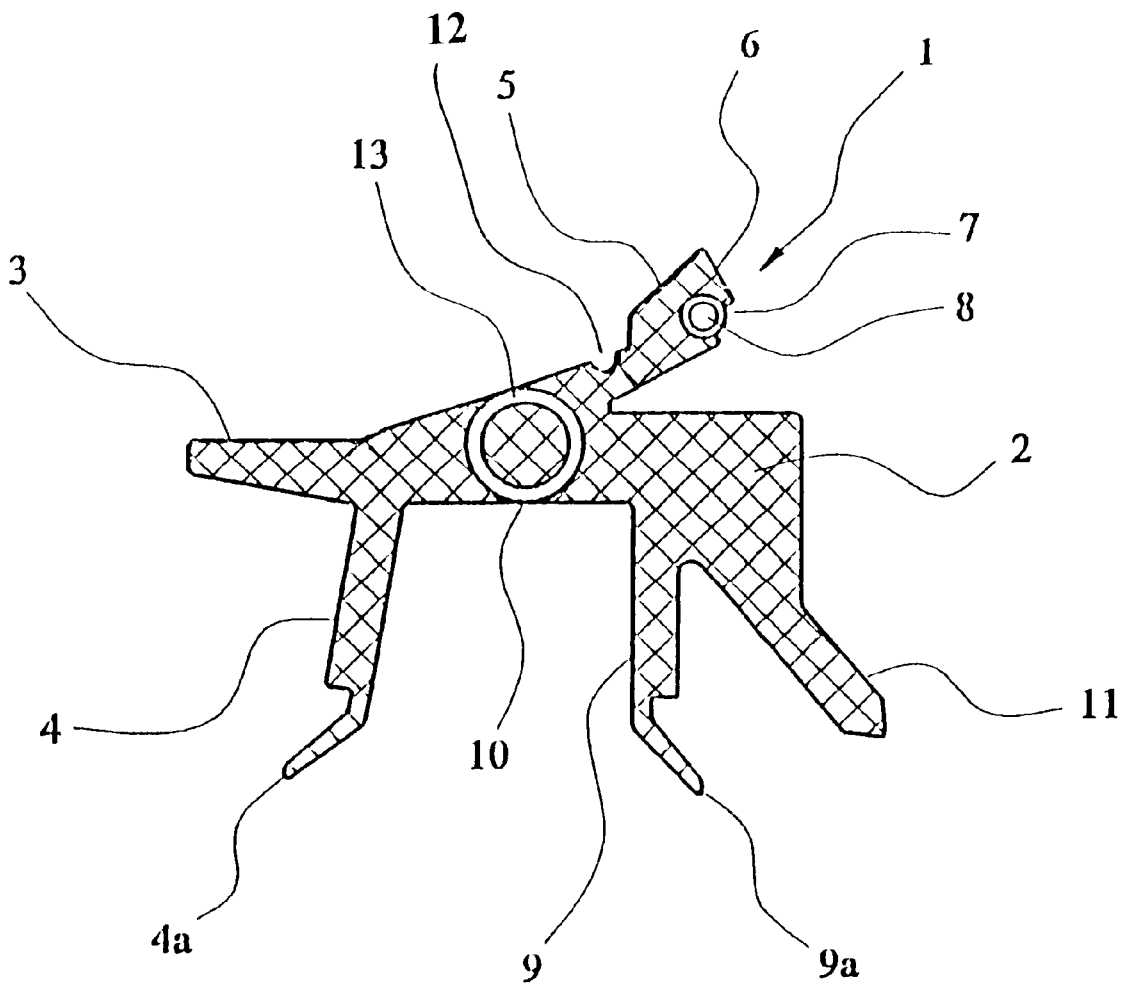
FIG. 3 illustrates an alternate embodiment of the seal assembly of the invention in cross-sectional view.

With reference to FIG. 2, the seal element 1 is shown in its stressed state ie mounted on the rotatable tapered section 21 of a roll neck. The first bearing element of the sealing assembly mounted on the rotatable roll neck 22 comprises sleeve 23 and the seal element 1. The fixed second bearing element of the sealing assembly comprises bushing 24 carried in chock 25. The bushing 24 and sleeve 23 are at least partially opposed to define a contact surface 26 which is oil filled in use. The end of the chock 25 provides a reservoir 36 in which oil may be collected for drainage purposes and re-circulation.

The fixed second bearing element includes the seal end plate 27 whose inner face 27a provides the surface which the peripheral lips of the seal element contact. The seal end plate is fastened to the chock by a conventional fastener 28. The seal end plate 27 is additionally provided with a radially inwardly extending rigid circular flange or "dam" 32 which is perpendicular to the bearing axis. The inner edge of the dam is spaced radially from the exterior cylindrical surface 10 of the seal element 1.

The seal assembly additionally comprises a coolant seal 29 having a radial mounting flange 29a integrally attached at its inner edge to a sealing flange 29b extending angularly and flexibly therefrom towards the roll face 30.

The seal assembly is also provided with a water-side flinger ring 31 carried on the roll for rotation therewith. This prevents water being dispersed into the area of the seal element.

What is claimed is:

1. A seal element mountable on the tapered section of a roll neck in a rolling mill, the seal element comprising:

a substantially annular main body from which; in the unstressed state, extends substantially axially a water-side lip and from which extends a water-side flange in a radial direction; and means for accommodating the tendency for the water-side flange to distort when the seal element is axially received on the tapered section of a roll neck.

2. A seal element as claimed in claim 1 wherein the means for accommodating comprises a notch provided at or near to the junction of the axial water-side lip and annular main body.

3. A seal element as claimed in claim 2 wherein the notch is provided on a tapered interior surface of the seal element.

4. A seal element as claimed in claim 2 wherein the notch is provided on the interior surface of an oil-side lip.

5. A seal element as claimed in claim 2 wherein the notch is provided on the interior surface of the axial, water-side lip.

6. A seal element as claimed in claim 2 wherein the notch is provided around the full circumferential extent of the seal element.

7. A seal element as claimed in claim 2 wherein the notch is a circular, U-shaped channel.

8. A seal element as claimed in claim 1 wherein the water-side flange is non-perpendicularly disposed in the radial direction.

9. A seal element as claimed in claim 8 wherein the water-side flange is disposed at an angle in the range 60 to 89°.

10. A seal element as claimed in claim 8 wherein the water-side flange is disposed at an angle in the range 70 to 85°.

11. A seal element as claimed in claim 8, wherein the water-side flange is disposed at an angle of about 80° to the axis of the seal element.

12. A seal element as claimed in claim 1 comprising an oil-side angularly disposed flexible lip adapted to assist mounting on the tapered section of the rolling mill roll neck.

13. A seal element as claimed in claim 12 wherein the oil-side lip is provided with an enlarged peripheral end.

14. A seal element as claimed in claim 1 the seal element further comprises one or more oil-side flanges.

15. A seal element as claimed in claim 14 comprising a first oil-side flange adapted to sliding contact a stationary portion of the sealing assembly in a similar manner to the water-side flange.

16. A seal element as claimed in claim 14 wherein the water-side and oil-side flanges are provided with peripheral lips which extend from the heel portion of the flange.

17. A seal element as claimed in claim 14 wherein the oil and water-side flanges are axially separated by a cylindrical exterior surface.

18. A sealing assembly for use in conjunction with the rotatable tapered section of a roll neck which is part of a roll in a rolling mill, said sealing assembly having a first bearing element mounted on said rotatable tapered section and at least partially opposing a fixed second bearing element to define a contact surface therebetween which is adapted to receive lubricant, wherein said first bearing element comprises a seal element as defined in any preceding claim positioned between the contact surface and the roll.

* * * * *